United States Patent [19]

Lassmann et al.

[11] 4,280,824
[45] Jul. 28, 1981

[54] PROCESS FOR PROVIDING A FEED GAS FOR A CHEMICAL REACTION AND FOR THE SEPARATION OF A GASEOUS REACTION PRODUCT

[75] Inventors: Eberhard Lassmann, Herrnhausen; Christian Benkmann, Munich, both of Fed. Rep. of Germany

[73] Assignee: Linde Aktiengesellschaft, Wiesbaden, Fed. Rep. of Germany

[21] Appl. No.: 103,773

[22] Filed: Dec. 14, 1979

[30] Foreign Application Priority Data

Dec. 14, 1978 [DE] Fed. Rep. of Germany ....... 2854060

[51] Int. Cl.$^3$ ............................................. B01D 53/04
[52] U.S. Cl. ........................................... 55/26; 55/33; 55/58; 55/62; 55/68; 55/74; 55/75; 423/581
[58] Field of Search ................... 55/25, 26, 33, 58, 62, 55/68, 74, 75; 423/359, 573 G, 581

[56] References Cited

U.S. PATENT DOCUMENTS

| 2,872,397 | 2/1959 | Kiffer .................................. 55/74 X |
| 3,864,460 | 2/1975 | Connell ...................... 423/573 G X |
| 4,210,627 | 7/1980 | Verloop et al. ..................... 55/18 X |

FOREIGN PATENT DOCUMENTS

| 2548198 | 6/1976 | Fed. Rep. of Germany ........... 423/581 |
| 2610227 | 9/1976 | Fed. Rep. of Germany . |
| 2641316 | 3/1977 | Fed. Rep. of Germany ........... 423/581 |
| 2655621 | 7/1977 | Fed. Rep. of Germany ........... 423/581 |
| 50-116390 | 9/1975 | Japan ....................................... 423/581 |

Primary Examiner—Robert H. Spitzer
Attorney, Agent, or Firm—Millen & White

[57] ABSTRACT

A process for providing a feed gas for a chemical reaction and for separating a gaseous reaction product from the gaseous mixture obtained by the reaction, wherein the feed gas is obtained by the fractionation of a crude gas mixture containing this feed gas proper, as well as a carrier gas or carrier gas mixture, and is reacted only incompletely in the reaction, and wherein the unreacted proportion is to be recycled into the reaction, the improvement wherein the fractionation of the crude gas mixture and the separation of the gaseous reaction product are conducted in a single adsorption plant operating by the pressure swing method and containing cyclically reversible adsorbers.

17 Claims, 5 Drawing Figures

PROCESS FOR PROVIDING A FEED GAS FOR A CHEMICAL REACTION AND FOR THE SEPARATION OF A GASEOUS REACTION PRODUCT

BACKGROUND OF THE INVENTION

This invention relates to the separation of gases by adsorption, and in particular to the adsorption separation of a feed gas from a crude gas, reacting the feed gas incompletely, adsorption separating product gas from feed gas, and recycling unreacted feed gas to the reaction stage.

Such a process has been known, for example, from DOS [German Unexamined Laid-Open Application] No. 2,610,227. This reference involves the production and recovery of ozone from a gaseous oxygen stream. The ozone is produced in a multistage ozone generator where oxygen atoms and oxygen molecules are combined. The energy required for splitting the oxygen molecules into atoms is supplied by electrical energy. The gaseous mixture withdrawn from the ozone-forming reaction contains several volume percent of ozone which represents the reaction product. The ozone-oxygen mixture is conducted to an adsorber station where the ozone content is preferably adsorbed, the adsorbent employed being preferably silica gel. Unadsorbed oxygen is recycled to the inlet of the ozone generator which is also charged with an oxygen content corresponding to the proportion of oxygen consumed during the ozone-forming reaction.

The feed oxygen, introduced continuously into the ozone generator, is obtained in a separate air fractionation plant which, for example, can be an adsorption plant. The desorption of the ozone separated in the adsorber station is effected with the aid of an inert scavenging gas, for example with the nitrogen obtained in the air fractionation plant. The air fractionation plant can be operated, if it is an adsorption plant, by using one of the conventional pressure swing processes.

The conventional process is highly oxygen-efficient since the unreacted oxygen from the ozone generator is constantly recycled, and only the proportion converted to ozone need be replaced by air fractionation. However, the process requires a large initial investment for the necessary apparatus. Thus, the system comprises an adsorber station for the separation of the ozone from the oxygen stream, as well as a separate air fractionation plant to obtain the oxygen. The considerable expenditure in apparatus must cover the adsorbent tanks proper as well as the associated control devices and fittings, noting that each of the two plants has at least two, and preferably three or four cyclically reversible adsorbent tanks.

In addition, assuming the adsorption of the components to be separated is conducted at low temperatures, as is often the case with adsorption processes, then, with two separate adsorption plants, there is also twice the expense for thermal insulation and for compensating for insulation losses.

SUMMARY OF THE INVENTION

An object of the present invention is to provide an improved process of the type mentioned above which permits a reduction in expenditures for apparatus.

Upon further study of the specification and appended claims, further objects and advantages of this invention will become apparent to those skilled in the art.

These objects are attained by conducting the fractionation of the crude gas mixture and the fractionation of the reaction gas mixture in a single pressure swing adsorption plant employing cyclically reversible adsorbers.

The invention, therefore, comprises a sophisticated, unobvious integration of two process steps, which heretofore have always been conducted separately, since in practice such steps have served to solve two different problems. It is possible, by using the pressure swing process which is amenable to a plurality of possible process variations, to integrate within a single process the two partial tasks of fractionating the crude gas mixture and of separating the gaseous reaction product. The pressure swing method is applicable in the present context with special advantage, for the reason that it offers a plurality of successive phases, especially when using at least three cyclically reversible adsorbers, which phases are passed through by each individual adsorber. As a consequence, optimum adaptation to the specifically present conditions can be attained in an individual case.

The basic principle of the invention can be realized in various ways. The pressure swing method here offers two possibilities, in principle, of adsorber operation with adsorptive effect: on the one hand, the actual adsorption phases, which normally take place under uniform pressure, and on the other hand with the pressure buildup phases taking place under increasing pressure. The more adsorbers are present, the greater can be the number of pressure buildup phases provided. Moreover, it is also possible to connect several adsorption phases in series, wherein the adsorber is respectively charged with gaseous mixtures of differing compositions, the adsorbent or adsorbents being loaded successively.

Thus, one possible embodiment of the invention resides in that the adsorbers are charged selectively in respectively successive adsorption phases, on the one hand, with the crude gas mixture and, on the other hand, with the gaseous mixture obtained by the chemical reaction.

Another embodiment resides in that the adsorbers are charged selectively, in each case during a pressure buildup phase and a subsequent adsorption phase, on the one hand, with the crude gas mixture and, on the other hand, with the gaseous mixtures obtained by the chemical reaction. In this case, it will frequently be advantageous to effect the fractionation of the crude gas mixture during an adsorption phase and the separation of the gaseous reaction product during a pressure buildup phase preceding this adsorption phase, especially if the crude gas mixture is available at a pressure which is higher than that of the gaseous mixture obtained by the chemical reaction. However, the procedure can also be such that the fractionation of the crude gas mixture is conducted during a first adsorption phase and the separation of the gaseous reaction product is effected during a second adsorption phase following the first adsorption phase.

The method employed in an individual case depends, above all, on the adsorption characteristics of the components to be separated and on the partial pressures of the feed gas, on the one hand, in the crude gas mixture and, on the other hand, in the gaseous mixture evolving from the reaction, the latter being referred to hereinafter as the reaction gas mixture. Since the feed gas is to be separated from the crude gas mixture as well as from the reaction gas mixture, the feed gas requires special consideration. Therefore, first, one must distinguish between the two cases where the feed gas is adsorbed either to a markedly weaker extent or to a markedly stronger extent than the two other gases, namely the carrier gas and the gaseous reaction product. Besides, an important factor is whether the feed gas is present in the crude gas mixture or in the reaction gas mixture in the higher concentration or under the higher partial pressure.

If the feed gas is the least adsorbable gas, as will frequently be the case, then it is necessary to conduct as the last of the two separating processes, namely the fractionation of the crude gas mixture and the separation of the gaseous reaction product from the reaction gas mixture, in all cases the separating process wherein the feed gas is present in the lesser concentration and/or under the lower partial pressure. This has the result that the gaseous mixture present in the void volume of the adsorber at the beginning of the expansion phases is in each instance maximally poor in feed gas and consequently a maximally large portion of feed gas can be supplied to the chemical reaction directly, i.e. rather than detouring the feed gas via pressure buildup stages. Besides, during pressure swing processes, a portion of the expansion gas frequently is not utilized for pressure buildup but rather is either completely blown off or employed for purging another adsorber during the desorption phase; here again, it is required that the expansion gas be maximally poor in feed gas. Thus, if the product gas mixture is richer in feed gas than the crude gas mixture, then the product gas mixture is advantageously conducted into the adsorber before the crude gas mixture, possibly during a pressure buildup stage.

In contrast thereto, if the feed gas is contained in the crude gas mixture in a higher concentration or under a higher partial pressure than in the product gas mixture, then the crude gas mixture is advantageously conducted into the adsorber as the first charge. This holds true, as mentioned above, under the condition that the feed gas is adsorbed to the weakest extent.

If the feed gas is the component which is adsorbed to the strongest extent, the relationships are reversed. This is so, because in this case the important point during the second phase of two successive charging phases is to prevent a portion of the feed gas already adsorbed in the first phase from reentering the gaseous phase. Accordingly, the gaseous mixture wherein the feed gas is present in a higher concentration and/or under a higher partial pressure should be introduced into the adsorber only during the second operating phase. By means of this feature, a maximum amount of feed gas is retained, in total, by adsorption.

If the adsorbent is selected so that the feed gas is adsorbed by the adsorbent to a markedly weaker degree as compared to the carrier gas or carrier gas mixture as well as compared to the gaseous reaction product, the process can be conducted so that the carrier gas as well as the gaseous reaction product are desorbed together. This possibility is applicable if it is permissible or desirable to obtain the gaseous reaction product in a dilution by the carrier gas, or to store or utilize same in this condition. Otherwise, adsorbers can be employed containing respectively two series-connected adsorbent beds, one of which preferably adsorbs the carrier gas or carrier gas mixture and the other of which preferably adsorbs the gaseous mixture obtained by the chemical reaction, wherein the desorption is accomplished by simultaneous evacuation from both adsorber ends. In this way, the carrier gas and the gaseous reaction product can be obtained separately.

In contrast thereto, if the feed gas is the component adsorbed by the adsorbent to a markedly stronger degree as compared to the carrier gas or carrier gas mixture and also as compared to the gaseous reaction product, then the possibility of separately obtaining the gaseous reaction product exists only if the two separating processes are effected in two adsorption phases, rather than in one pressure buildup phase and a subsequent adsorption phase, since during a pressure buildup phase the entire gaseous mixture remains in the adsorber, and the component, which is not adsorbed, though being displaced at the beginning of the subsequent adsorption phase, causes problems with respect to its flawless separation.

DETAILED DESCRIPTION OF THE DRAWINGS

Figure 1:
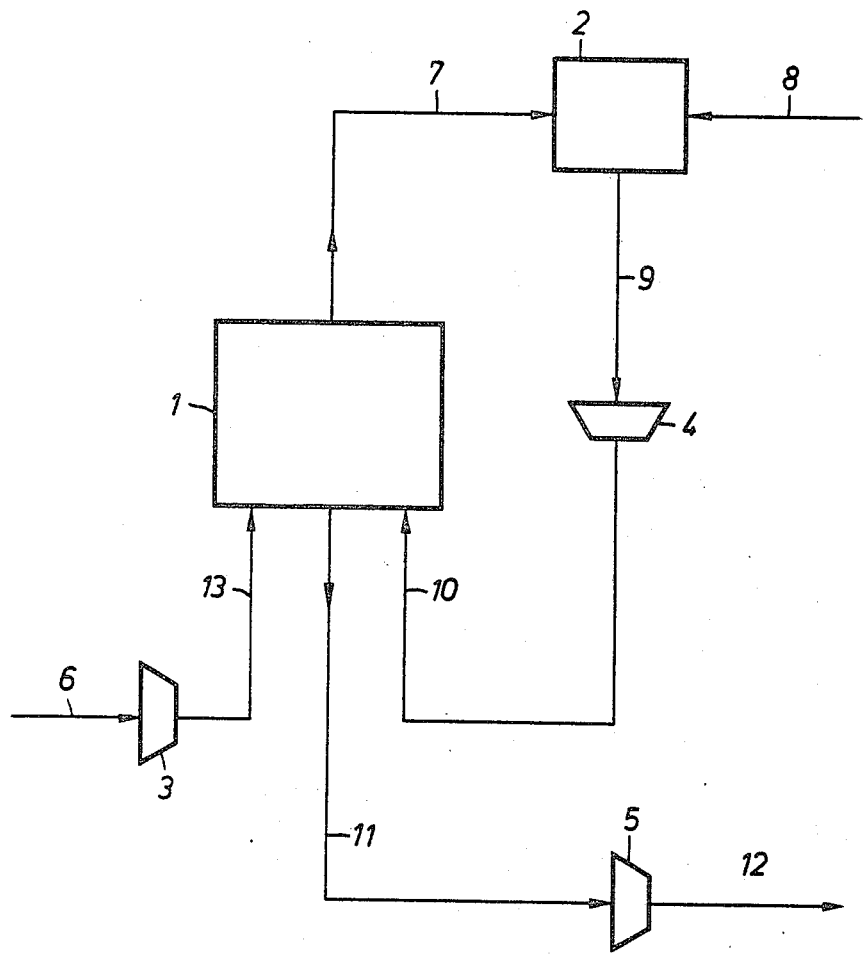
FIG. 1 is a schematic flow chart of the general course of the process.

In FIG. 1, numeral 1 denotes the single adsorption plant provided according to this invention, 2 is the reactor for conducting the chemical reaction, 3 is a compressor for the compression of the crude gas mixture to the adsorption pressure, 4 is a cycle compressor for the gaseous mixture obtained by the reaction, and 5 is a compressor, a blower, or a vacuum pump to remove the gaseous reaction product as well as optionally the carrier gas. The crude gas mixture consisting of a carrier gas or carrier gas mixture and a feed gas is fed via a conduit 6 to the crude gas compressor 3, is compressed therein to the adsorption pressure, optionally cooled to the adsorption temperature, introduced into the adsorption plant via a conduit 13, and subjected to adsorption in the adsorption plant. The feed gas is separated therein from the carrier gas or carrier gas mixture and fed via a conduit 7 into the reactor 2; via conduit 8, additional components participating in the reaction are optionally introduced into this reactor.

The gaseous mixture obtained by the reaction, containing unreacted feed gas in addition to the gaseous reaction product, is withdrawn from the reactor 2 via a conduit 9, optionally recompressed by means of the cycle compressor 4, and thereafter recooled and finally recycled into the adsorption plant 1 via a conduit 10. In the adsorption plant, the gaseous reaction product is separated and removed by suction via conduit 11 with the aid of the vacuum pump or compressor 5, optionally together with the carrier gas or carrier gas mixture. The gaseous reaction product, compressed to the desired final pressure, can then be withdrawn via conduit 12. The unreacted feed gas is recycled into the reactor 2 via conduit 7.

Figure 2:
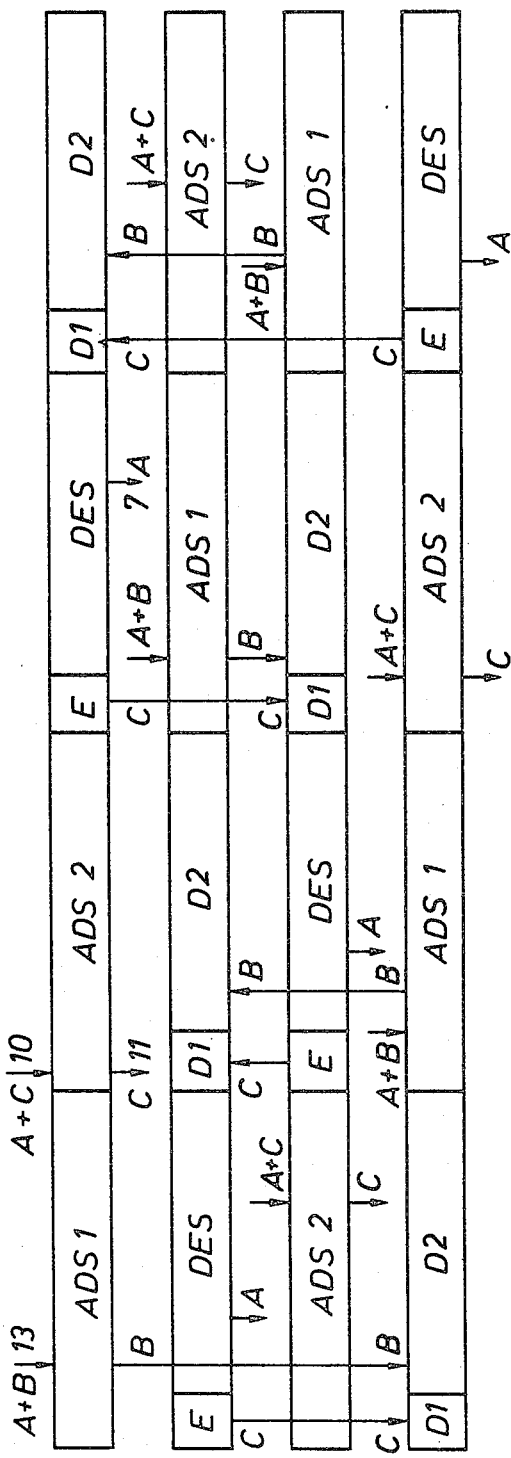
FIG. 2 is an operating sequence time diagram of an adsorption plant with four adsorbers, with two series-connected adsorption phases for the crude gas mixture and for the gaseous mixture obtained by the chemical reaction.

FIG. 2 demonstrates one possibility for conducting the process in the adsorption plant 1. In this specific case, the adsorption plant is to contain four cyclically reversible adsorbers, all of which pass through the same phase sequence. Each of these four adsorbers is represented in the figure by its own bar. The time progresses from the left toward the right. For the sake of simplicity, it is to be assumed that the crude gas mixture consists merely of two components, a carrier gas and the feed gas. As to the gaseous mixture obtained by the reaction, it is assumed that this mixture contains, in addition to a single gaseous reaction product, only the proportion of the feed gas to be recycled, i.e. that this gaseous mixture also consists of merely two components.

The embodiment of FIG. 2 relates to the case wherein the feed gas is adsorbed to a far greater extent than the carrier gas and the gaseous reaction product. Besides, another prerequisite is that the feed gas is present in a higher concentration in the gaseous mixture obtained by the reaction than in the crude gas mixture. In such a case, the crude gas mixture is introduced, in a first adsorption phase (ADS 1), even before the gaseous mixture obtained by the reaction into the respective adsorber, so that during this first adsorption phase carrier gas is discharged from the adsorber and feed gas is adsorbed. The thus-discharged carrier gas is utilized in a second pressure buildup stage (D2) of one of the three other adsorbers.

After conclusion of the first adsorption phase, the adsorber is precharged with feed gas. The adsorber then enters the second adsorption phase (ADS 2) during which it is traversed by the gaseous mixture obtained by the reaction. During this step, the adsorber is loaded with feed gas almost to the break point, and the proportion which is not adsorbed, namely the gaseous reaction product, is withdrawn from the adsorption plant via conduit 11. The presently completely loaded adsorber is then pressure-relieved, in a subsequent expansion phase (E) to the desorption pressure; during this step, the gaseous reaction product still present in the void volume of the adsorbent bed is substantially discharged. This gaseous reaction product is fed to one of the other three adsorbers during a first pressure buildup phase (D1). During the subsequent desorption phase, the thus-adsorbed feed gas is desorbed, for example with the aid of a vacuum pump, and, after compression to the pressure to be maintained during the reaction, introduced into the reactor.

Finally, the adsorber is again brought to the adsorption pressure in two successive pressure buildup phases. During the first pressure buildup phase (D1), the adsorber is fed with the expansion gas of one of the three other adsorbers. This gas consists essentially of gaseous reaction product, which is only very poorly adsorbed and is displaced from the adsorber during the later following, first adsorption phase (ADS 1). A second and final pressure buildup phase (D2) follows the first pressure buildup phase; during this second phase, carrier gas which has not been adsorbed is fed to the adsorber, this carrier gas stemming from the first adsorption phase (ADS 1) of another adsorber. After the two pressure buildup phases, the interior of the adsorber thus contains a gaseous mixture of gas-phase reaction product as well as carrier gas. This mixture is displaced, at the beginning of the subsequent, first adsorption phase, by an incoming, unadsorbed carrier gas from the void volume of the adsorber. Since, at the onset of the first adsorption phase, the second pressure buildup phase of the corresponding other adsorber has not as yet begun, it is possible to either blow off this unadsorbed carrier gas or to utilize this gas during the first pressure buildup phase of the same, other adsorber.

The flow, as well as the correlation of the adsorbers, is marked by arrows in FIG. 2. The diagram indicates additionally the components involved in each particular case: A stands for the feed gas, B for the carrier gas, and C for the gaseous reaction product. It is furthermore noted at the upper bar which conduits of those shown in FIG. 1 are respectively utilized for feeding or discharging the gaseous mixtures or individual gases. In the marking of the gases discharged during the two adsorption phases, the diagram of the figure does not take into account that gaseous mixtures of B and C are obtained at the beginning of the respective phases.

Figure 3:
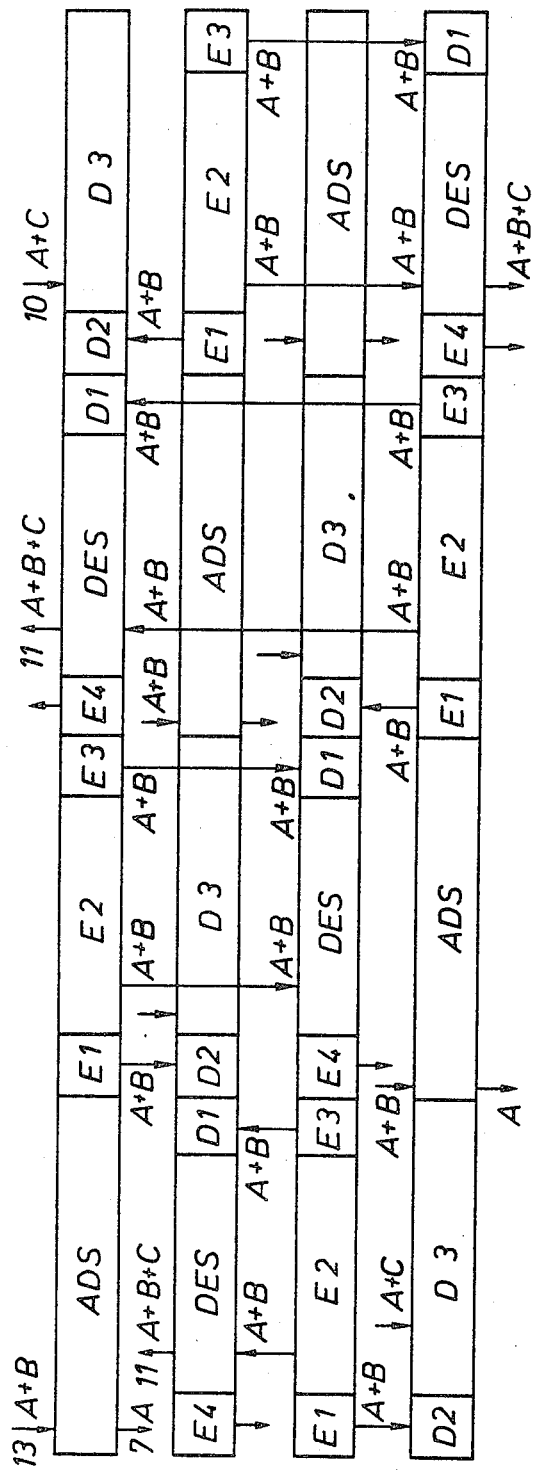
FIG. 3 is an operating sequence time diagram of an adsorption plant with four adsorbers, with a final pressure buildup phase including the introduction of the gaseous mixture obtained by the chamical reaction, as well as with a subsequent adsorption phase for the crude gas mixture.

The embodiment shown in FIG. 3 in the form of an operating sequence time diagram relates to the case wherein the feed gas is adsorbable to a substantially poorer extent than the carrier gas and the gaseous reaction product. Furthermore, there is also the prerequisite in this case that the gaseous mixture obtained by the reaction is richer in feed gas than the crude gas mixture. This embodiment likewise employs four cyclically reversible adsorbers which pass through respectively the same phases with a certain phase shift. The method of illustration is otherwise the same as in FIG. 2.

As contrasted to FIG. 2, the embodiment of FIG. 3 provides four expansion phases and three pressure buildup phases, but only one adsorption phase taking place at the highest pressure, namely the adsorption pressure. The adsorber, which is at the adsorption pressure after passing through the pressure buildup phases (D1, D2, D3), is charged, during the presently beginning adsorption phase (ADS), with the crude gas mixture (A+B) fed via conduit 13. The adsorber, already charged with gaseous reaction product C during the final pressure buildup phase (D3), as will be explained below, is additionally loaded with carrier gas B during the adsorption phase, whereas the most poorly adsorbable component, namely the feed gas A, is again discharged from the adsorber in almost its entirety, to be fed to the reactor via conduit 7. After saturation of the adsorbent or adsorbents with the adsorbed components, the adsorption phase is concluded, and the first expansion phase (E1) is initiated. The gas present in the void volume of the adsorber, which has almost the composition of the crude gas mixture upon saturation of the adsorbent, is in part withdrawn from the adsorber and utilized in the second pressure buildup phase (D2) of another adsorber, until a certain intermediate pressure has been reached in the first adsorber at which the second expansion phase (E2) begins. The gas withdrawn during this expansion phase, which latter leads to a still lower intermediate pressure, and corresponding in its composition likewise to the crude gas mixture is utilized as the purge gas for desorbing another one of the three remaining adsorbers. The gaseous mixture escaping during a third expansion phase (E3) is introduced into the other, just previously purged adsorber in the first pressure buildup phase (D1) thereof. Finally, the adsorber is expanded to the desorption pressure, and the gaseous mixture escaping during the last expansion phase (E4) required for this purpose is blown off, optionally in dilution with an inert gas harmless to the environment.

The composition of the gaseous mixtures escaping during the last two expansion phases (E3, E4) depends on the respectively attained intermediate pressures. The lower the desorption pressure proper, or the lower these intermediate pressures, the earlier is the point in time at whih desorbed components are already present in the final expansion gases. However, since the gaseous reaction product C is to be obtained as completely as possible, the process is to be controlled in such a way that the final expansion gases are maximally free of this component. During the subsequent desorption phase (DES), the adsorbed components, namely the carrier gas B as well as the gaseous reaction product C are driven out as completely as possible. This is done either with the aid of a vacuum pump or, as illustrated in FIG. 3, by flushing with the expansion gas of the second expansion phase (E2) of another adsorber. The pressure buildup during the first two pressure buildup phases (D1, D2) takes place respectively with expansion gases having approximately the composition of the crude gas mixture. In this process, the adsorbent is already preliminarily loaded with carrier gas, though to a very minor extent. In the finally following, third and last pressure buildup phase (D3), the gaseous mixture (A+C) fed via conduit 10 and obtained by the chemical reaction is introduced into the adsorber. The latter is thus again brought to the adsorption pressure, wherein almost the entire gaseous reaction product C is adsorbed, so that at the conclusion of the third pressure buildup phase there remains in the void volume of the adsorber almost exclusively feed gas A for the chemical reaction. This feed gas is displaced during the subsequent adsorption phase and fed to the reactor 2 via conduit 7.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are sent forth uncorrected in degrees Celsius; unless otherwise indicated, all parts and percentages are by weight.

Figure 4:
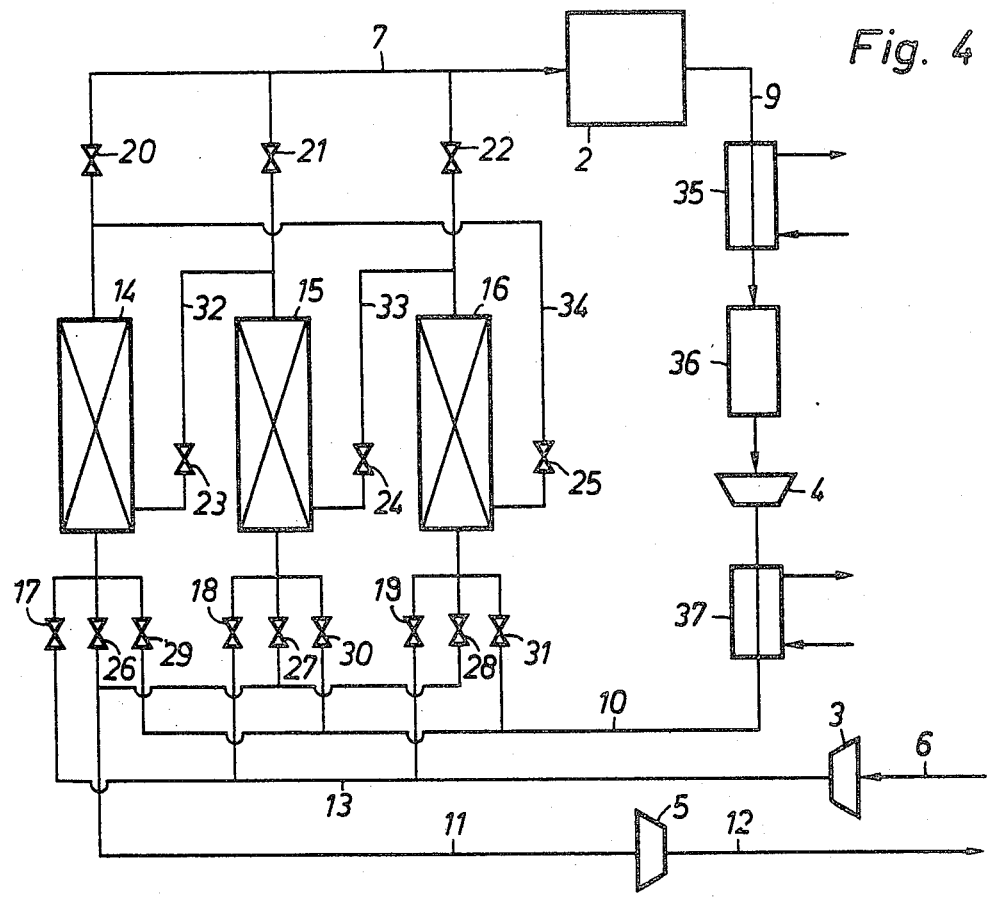
FIG. 4 illustrates schematically the process sequence of a preferred specific embodiment, namely the production of ozone from air with the aid of an adsorption plant with three adsorbers.

In the specific example, as shown in FIG. 4, the process is exemplified in relation to the production of ozone from air. Several reference numerals are incorporated, having the same meanings as in FIG. 1.

Via conduit 6, 15.17 kilomoles per hour of air is introduced, compressed on compressor 3 to 2 bar, and fed into an adsorber 14 via conduit 13 and an open valve 17. The adsorber contains 100 kg. of activated alumina, 350 kg. of small-pore silica gel, as well as 1500 kg. of a zeolite-type molecular sieve 5A. The activated alumina serves for the absorption of water vapor from the air, the silica gel serves for the absorption of ozone and carbon dioxide contained in the air, the molecular sieve serves for the adsorption of nitrogen. During the adsorption phase taking place at a temperature of 30° C., a gaseous mixture consisting of 90 molar percent of oxygen and 5 molar percent each of argon and nitrogen is discharged from the outlet end of the adsorber 14 via an opened valve 20 as well as via conduit 7. The molecular sieve packing is loaded with nitrogen almost to the break point. This gaseous mixture, which accordingly consists of 90 molar percent of the feed gas, oxygen, intended for the ozone-forming reaction, is fed to reactor 2 in an amount of 22.3 kmol./h. In the reactor, part of the molecular oxygen is converted into ozone by supplying electrical energy. The gaseous mixture obtained in this way by the ozone-forming reaction, consisting of 85.7 mol-% oxygen, 4.1 mol-% ozone, and respectively 5.1 mol-% argon and nitrogen, is withdrawn in an amount of 21.86 kmol./h. via conduit 9, cooled down to 30° C. in a cooler 35 operated with external cooling, and introduced into a buffer tank 36.

The data regarding quantities and concentrations for the gaseous mixtures flowing through conduits 7 and 9 are chronologically averaged values. As can be seen from the remarks set forth below, slight changes in concentration can occur at the beginning of the adsorption phases since first of all a gaseous mixture present in the void volume of the adsorber must be displaced. The buffer tank serves for the compensation of such fluctuations.

Subsequently, the gaseous mixture obtained by the ozoneforming reaction is recompressed in cycle compressor 4 to 2 bar for compensating for incurred pressure losses, recooled in an external cooler 37, and introduced via conduit 10 as well as an opened valve 30 into an adsorber 15 where the ozone proportion is adsorbed by the silica gel filling. This takes place during a second pressure buildup phase with the valve 21 being closed. After conclusion of this pressure buildup phase, the adsorber 15 is switched to the adsorption phase. The second pressure buildup phase is preceded by a first pressure buildup phase, during which expansion gas from the previously loaded adsorber, in this case adsorber 16, flows into the adsorber 15, the latter to be brought again to adsorption pressure, namely via conduit 33 with the valve 24 being open. The expansion gas remaining in the void volume of adsorber 16 after termination of the adsorption phase is approximately the composition of air, since the molecular sieve packing is almost entirely saturated with nitrogen during the adsorption phase. After this expansion, at the end of which a pressure is attained of 0.9 bar, desorption of adsorber 16 is conducted. For this purpose, a valve 28 is opened and the inlet side of the adsorber is thus connected via conduit 11 to the vacuum pump 5. Thereby the thus-adsorbed ozone and the thus-adsorbed nitrogen are removed by suction. Toward the end of the desorption phase, a pressure is reached of about 0.1 bar. On a chronological average, 14.72 kmol./h. of a gaseous mixture is withdrawn during the desorption phases consisting of 80.5 mol-% nitrogen, 12.5 mol-% oxygen, 6.0 mol-% ozone, and 1 mol-% argon. The oxygen proportion stems from the gaseous mixture still remaining in the adsorber after the expansion, having approximately the composition of air. The high oxygen proportion contained in the gaseous mixture produced by the ozone-forming reaction, which proportion initially passes into adsorber 15 during the second pressure buildup phase, is displaced from this adsorber at the beginning of the subsequent adsorption phase and is recycled via the valve 21, which is open at that time, and via conduit 7 into the reactor 2.

Figure 5:
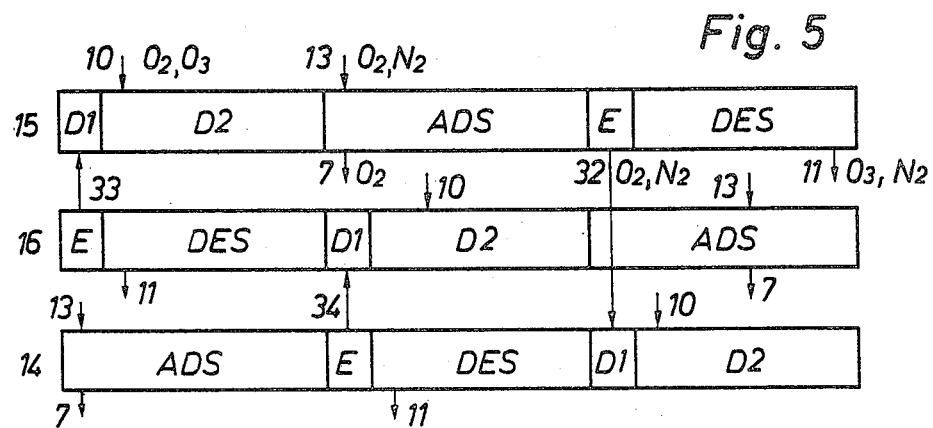
FIG. 5 is the operating sequence time diagram for the process of FIG. 4.

The chronological operating sequence, as well as the correlation of the individual adsorbers can be seen from the operating sequence diagram of FIG. 5. According to the latter, each individual adsorber passes through a first pressure buildup phase (D1), the duration of which is about 0.5 minute; a second pressure buildup phase (D2) having a duration of about 2.5 minutes, for example; an adsorption phase (ADS) lasting about 3 minutes; a single expansion phase (E) of 0.5 minute's duration; as well as a desorption phase (DES) of again 2.5 minutes. The chronological sequence in the diagram is from the left toward the right. The correlation of the bars to the three adsorbers 14, 15, 16 is indicated on the left-hand side. The arrows symbolize the gases or gaseous mixtures which are fed or discharged, respectively, wherein the reference numerals of the appropriate conduits and the substantial gaseous components are also indicated.

As regards the valve positions, the following applies: During operation of the adsorber 14, valves 17 and 20 are opened during the adsorption phase, valves 26, 29, 23, as well as 25 are closed; during the expansion phase, valves 17, 26, 29, 20, as well as 23 are closed and valve 25 is opened; during the desorption phase, valve 26 is open and valves 17, 29, 20, 23, as well as 25 are closed; during the first pressure buildup phase, valve 23 is open and valves 17, 26, 29, 20, as well as 25 are closed; and during the second pressure buildup phase, valve 29 is open and valves 26, 17, 23, 25, and 20 are closed. Corresponding remarks apply in connection with adsorbers 15 and 16.

It is thus possible with the aid of the aforedescribed process to convert the oxygen contained in an air stream into ozone to the extent of approximately 40%. The gaseous stream withdrawn from the plant and containing 6 mol-% ozone, as well as nitrogen and oxygen can be utilized, for example, in wastewater processing.

The process according to the invention, however, is nowise restricted in its applicability to ozone production. The process can be utilized in all cases where at least one of the feed gases for a chemical reaction is to be separated from a crude gas mixture and this can be done, on the basis of different adsorbabilities of the components to be separated, by means of adsorption; where, furthermore, a considerable portion of this feed gas is not reacted in the chemical reaction and thus is recycled; and where, again due to differing adsorbabilities, the proportion of the feed gas to be recycled can be separated by adsorption from the actual reaction product.

Another specific application among many, relates to the production of ammonia synthesis gas at moderate pressures. For example, if a crude hydrogen, which contains carbon oxides, is available, this hydrogen can first be freed from the carbon oxides in the adsorption plant and fed as the feed gas to the ammonia synthesis plant, the latter being then fed with nitrogen as a further gas participating in the reaction. Under moderate pressures, the gaseous mixture obtained by the synthesis reaction contains merely an ammonia proportion on the order of 10 vol-%. This gaseous mixture can then likewise be fractionated in the adsorption plant by separating the ammonia by adsorption and recycling the unreacted hydrogen proportion into the synthesis reaction.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An improved process for providing a feed gas for a chemical reaction and for separating a gaseous reaction product from the gaseous mixture obtained from a reaction to which the feed gas is submitted, wherein the feed gas is obtained by the fractionation of a crude gas mixture containing the feed gas, as well as a carrier gas or carrier gas mixture, and in which the feed gas is reacted only incompletely in the reaction, and wherein the unreacted proportion is to be recycled into the reaction, the improvement comprising conducting the fractionation of the crude gas mixture and the separation of the gaseous reaction product in the same adsorption plant containing cyclically reversible adsorbers, and operating by the pressure swing method.

2. A process according to claim 1, wherein said adsorbers are charged respectively in successive adsorption phases selectively, initially, with the crude gas mixture and, subsequently, with the gaseous mixture obtained by the chemical reaction.

3. A process according to claim 2, wherein said adsorbers contain an adsorbent or adsorbents capable of adsorbing the feed gas, relative to the adsorption of the carrier gas or carrier gas mixture, and to the adsorption of gaseous reaction product, to a lesser extent, and which allows for the carrier gas and the gaseous reaction product to be desorbed together.

4. A process according to claim 2, wherein said adsorbers each contain respectively two series-connected adsorbent beds, a first adsorbent bed which preferably adsorbs the carrier gas or carrier gas mixture, and a second adsorbent bed which preferably adsorbs the gaseous reaction product, and wherein the desorption of said adsorbers is effected by simultaneous suction removal from both ends of the adsorber.

5. A process according to claim 1, wherein the adsorbers are respectively charged during a pressure buildup phase and a subsequent adsorption phase selectively, initially, with the crude gas mixture and, subsequently, with the gaseous mixture obtained by the chemical reaction.

6. A process according to claim 5, wherein the fractionation of the crude gas mixture is effected during an adsorption phase and the separation of the gaseous reaction product is effected during a pressure buildup phase occurring prior to the adsorption phase.

7. A process according to claim 6, wherein said adsorbers contain an adsorbent or adsorbents capable of adsorbing the feed gas, relative to the adsorption of the carrier gas or carrier gas mixture and to the adsorption of the gaseous reaction product, to a lesser extent, and which allows for the carrier gas as well as the gaseous reaction product to be desorbed together.

8. A process according to claim 6, wherein said adsorbers contain respectively two series-connected adsorbent beds, a first adsorbent bed which adsorbs preferably the carrier gas or carrier gas mixture, and a second adsorbent bed which preferably adsorbs the gaseous reaction product, and wherein the desorption of said adsorbers is effected by simultaneous suction removal from both ends of the adsorber.

9. A process according to claim 5, wherein said adsorbers contain an adsorbent or adsorbents capable of adsorbing the feed gas, relative to the adsorption of the carrier gas or carrier gas mixture and to the adsorption of gaseous reaction product, to a lesser extent, and which allows for the carrier gas and the gaseous reaction product to be adsorbed together.

10. A process according to claim 5, wherein said adsorbers contain respectively two series-connected adsorbent beds, a first adsorbent bed which preferably adsorbs the carrier gas or carrier gas mixture, and a second adsorbent bed which preferably adsorbs the gaseous reaction product, and wherein the desorption of said adsorbers is effected by simultaneous suction removal from both ends of the adsorber.

11. An improved process for providing a feed gas for a chemical reaction and for separating a gaseous reaction product from the gaseous mixture obtained from a reaction to which the feed gas is submitted, wherein the feed gas is obtained by the fractionation of a crude gas mixture containing the feed gas, as well as a carrier gas or carrier gas mixture, and in which the feed gas is reacted only incompletely in the reaction, and wherein the unreacted proportion is to be recycled into the reaction, said process comprising: supplying a crude gas mixture, including components of a feed gas for a chemical reaction and of a carrier gas or carrier gas mixture, to a single adsorption plant which includes plural adsorbers; adsorbing one of the crude gas mixture components for separating said feed gas therefrom in said single adsorbing plant; feeding said gas from said single adsorption plant into a reactor and reacting it therein for obtaining a gaseous mixture including a gaseous reaction product and feed gas; compressing and feeding said gaseous mixture into said single adsorption plant for having said gaseous reaction product separated from said gaseous mixture; and removing said gaseous reaction product from said single adsorption plant and refeeding the unreacted feed gas into the reactor for cyclically repeating the process.

12. A process according to claim 11 wherein said single adsorbing plant comprises at least three adsorbers.

13. A process according to claim 11 wherein said process is for producing ozone from air and includes the steps of separating oxygen as the feed gas from air as the crude gas in said single adsorbing plant, reacting said oxygen to produce ozone as the gaseous reaction product, and subsequently recycling said reacted oxygen containing ozone through said single adsorption plant for separating ozone therefrom.

14. A process according to claim 13 wherein each of said plural adsorbers of said single adsorption plant include series connected layers of activated alumina for adsorbing water vapor from the air, silica gel for adsorbing ozone and carbon dioxide and a molecular sieve for adsorbing nitrogen which is the carrier gas.

15. A process according to claim 14 wherein said molecular sieve is of the zeolite type.

16. A process according to claim 1 wherein said single adsorption plant comprises four adsorbers capable of adsorbing feed gas more readily than said carrier gas and said gaseous reaction product, said process further comprising the steps of, introducing said crude gas into a first adsorber of said four adsorbers for having feed gas adsorbed therein and carrier gas discharged therefrom, feeding said discharged carrier gas into one of the other three of said four adsorbers for building up the pressure therein, desorbing feed gas contained in one adsorber of the other three of said four adsorbers which has adsorbed feed gas, passing said desorbed feed gas through said reactor for obtaining said gaseous mixture of said feed gas and said gaseous reaction product, said gaseous mixture having a proportion of feed gas greater than the proportion of feed gas in said crude gas mixture, passing said gaseous mixture through said first adsorber for separating said gaseous reaction product therefrom and removing said gaseous reaction product, expanding said first adsorber for removing remaining gaseous reaction product and feeding said remaining gaseous reaction product to another of said four adsorbers, and subsequently desorbing said adsorbed feed gas for refeeding into said reactor.

17. A process according to claim 11 wherein said single adsorption plant comprises four adsorbers capable of adsorbing carrier gas and gaseous reaction product more readily than said feed gas, said process further comprising the steps of, building up the pressure in a first of said four adsorbers in three phases, the last of said three phases including feeding gaseous reaction product into said first adsorber from another of the remaining three adsorbers, for having said gaseous reaction product adsorbed therein, feeding said crude gas mixture into said first adsorber for having said carrier gas adsorbed and for discharging said feed gas into said reactor, expanding said first adsorber in three steps for removing a gas having a composition similar to said crude gas mixture and feeding said crude gas composition respectively during each of said expansion steps, into one of said remaining three adsorbers for build-up of the pressure therein, into another of said remaining three adsorbers for purging during desorption thereof, and into said another of said three adsorbers, after having been purged for the first previous build-up phase, expanding said first adsorber a fourth time and blowing remaining gas out, desorbing said first adsorber of carrier gas and gaseous reaction product and removing them from the system.

* * * * *

UNITED STATES PATENT AND TRADEMARK OFFICE
CERTIFICATE OF CORRECTION

PATENT NO. : 4,280,824
DATED : July 28, 1981
INVENTOR(S) : EBERHARD LASSMANN ET AL It is certified that error appears in the above—identified patent and that said Letters Patent is hereby corrected as shown below:

Column 10, lines 59-60: reads "sorbent beds, a first adsorbent bed which adsorbs preferably the carrier gas or carrier gas mixture, and a sec-"
should read -- sorbent beds, a first adsorbent bed which preferably adsorbs the carrier gas or carrier gas mixture, and a sec- -- .

Column 11, line 3: reads "tion product to be adsorbed together"
should read -- tion product to be desorbed together -- .

Signed and Sealed this

Fifteenth Day of December 1981

[SEAL]

Attest:

GERALD J. MOSSINGHOFF

Attesting Officer  Commissioner of Patents and Trademarks